(12) United States Patent
Singley et al.

(10) Patent No.: US 11,566,718 B2
(45) Date of Patent: Jan. 31, 2023

(54) VALVES, VALVE ASSEMBLIES AND APPLICATIONS THEREOF

(71) Applicant: Kennametal Inc., Latrobe, PA (US)

(72) Inventors: Joshua T. Singley, Latrobe, PA (US); Grzegorz Dewicki, Greensburg, PA (US); Keith Brock, Sellersburg, IN (US); Ranjith Seenappa, Bangalore (IN)

(73) Assignee: KENNAMETAL INC., Latrobe, PA (US)

( * ) Notice: Subject to any disclaimer, the term of this patent is extended or adjusted under 35 U.S.C. 154(b) by 310 days.

(21) Appl. No.: 16/375,356

(22) Filed: Apr. 4, 2019

(65) Prior Publication Data

US 2020/0072369 A1 Mar. 5, 2020

Related U.S. Application Data

(63) Continuation-in-part of application No. 16/119,513, filed on Aug. 31, 2018, now abandoned.

(51) Int. Cl.
*F16K 25/04* (2006.01)
*F16K 25/00* (2006.01)
(Continued)

(52) U.S. Cl.
CPC ............ *F16K 25/04* (2013.01); *F16K 17/02* (2013.01); *F16K 25/005* (2013.01); *B22F 7/06* (2013.01)

(58) Field of Classification Search
CPC ..... F16K 1/12; F16K 1/34; F16K 1/36; F16K 1/38; F16K 1/42; F16K 1/46; F16K 1/465;
(Continued)

(56) References Cited

U.S. PATENT DOCUMENTS 2,103,503 A ‡ 12/1937 White .................. F04B 53/1027
137/32
2,745,631 A ‡ 5/1956 Shellman ............ F04B 53/1027
251/17
(Continued)

FOREIGN PATENT DOCUMENTS

CN     2861553 Y  ‡  1/2007
CN     2861553 Y      1/2007
(Continued)

OTHER PUBLICATIONS

Mar. 27, 2020 Non-Final OA.
(Continued)

*Primary Examiner* — Hailey K. Do
(74) *Attorney, Agent, or Firm* — Larry R. Meenan

(57) ABSTRACT

Valves and valve assemblies are described herein employing architectures which can mitigate degradative wear mechanisms, thereby prolonging life of the assembly. In one aspect, a valve comprises a head including a circumferential surface and a valve seat mating surface comprising sintered cemented carbide. Leg members extend from the head, wherein thickness of one or more of the leg members tapers in a direction away from the head to induce laminar fluid flow around the head. In some embodiments, the sintered cemented carbide is an inlay coupled to the valve head.

20 Claims, 17 Drawing Sheets

(51) Int. Cl.
*F16K 17/02* (2006.01)
*B22F 7/06* (2006.01)

(58) Field of Classification Search
CPC .......... F16K 1/54; F16K 15/02; F16K 15/021; F16K 15/23; F16K 15/06; F16K 15/063; F16K 15/066; F16K 15/025; F16K 15/026; F16K 17/12; F16K 25/00; F16K 25/005; F04B 1/182; F04B 1/186
See application file for complete search history.

(56) References Cited

U.S. PATENT DOCUMENTS

| | | | | |
|---|---|---|---|---|
| 2,969,951 | A ‡ | 1/1961 | Walton | F04B 53/1027 251/33 |
| 2,982,515 | A ‡ | 5/1961 | Ruke | F16K 1/465 251/33 |
| 3,053,500 | A | 9/1962 | Atkinson | |
| 3,063,467 | A ‡ | 11/1962 | Roberts, Jr. | F16K 1/465 137/51 |
| 4,076,212 | A * | 2/1978 | Leman | F16K 1/46 137/516.29 |
| 4,425,699 | A ‡ | 1/1984 | Nordin | B21K 25/00 277/39 |
| 4,512,298 | A ‡ | 4/1985 | Hayashi | F16N 39/06 129/19 |
| 4,572,298 | A ‡ | 2/1986 | Weston | E21B 29/04 166/37 |
| 4,911,410 | A ‡ | 3/1990 | Baker | E21B 29/04 251/1 |
| 14,911,410 | | 3/1990 | Baker | |
| 4,951,707 | A ‡ | 8/1990 | Johnson | F04B 53/1025 137/51 |
| 4,997,162 | A ‡ | 3/1991 | Baker | E21B 29/04 251/1 |
| 5,002,834 | A ‡ | 3/1991 | Smith | B32B 15/01 148/42 |
| 5,062,450 | A ‡ | 11/1991 | Bailey | E21B 33/13 137/51 |
| 5,082,020 | A | 1/1992 | Bailey et al. | |
| 5,249,600 | A ‡ | 10/1993 | Blume | F04B 53/1087 137/51 |
| 5,275,204 | A ‡ | 1/1994 | Rogers | F04B 53/1027 137/51 |
| 5,345,965 | A ‡ | 9/1994 | Blume | F04B 53/1027 137/51 |
| 5,501,424 | A ‡ | 3/1996 | Williams | E21B 29/04 251/1 |
| 6,139,599 | A ‡ | 10/2000 | Takahashi | C22C 33/0207 123/18 |
| 6,382,940 | B1 ‡ | 5/2002 | Blume | F04B 53/007 277/43 |
| 6,464,749 | B1 ‡ | 10/2002 | Kawase | C22C 33/0207 75/246 |
| 6,641,779 | B2 ‡ | 11/2003 | Kawase | C22C 33/0207 419/38 |
| 6,712,871 | B2 ‡ | 3/2004 | Oh | C22C 33/0207 419/14 |
| 6,802,883 | B2 ‡ | 10/2004 | Henmi | C22C 33/0207 419/12 |
| 6,916,444 | B1 ‡ | 7/2005 | Liang | C22C 38/02 148/32 |
| 6,951,579 | B2 ‡ | 10/2005 | Koyama | C22C 33/0228 419/14 |
| 6,955,181 | B1 ‡ | 10/2005 | Blume | F16K 1/38 137/15 |
| 7,070,166 | B1 ‡ | 7/2006 | Blume | F04B 53/102 251/35 |
| 7,273,508 | B2 ‡ | 9/2007 | Sato | C22C 1/02 75/243 |
| 7,478,673 | B2 ‡ | 1/2009 | Boyd | E21B 33/068 166/17 |
| 7,540,470 | B1 ‡ | 6/2009 | Blume | F04B 53/102 137/15 |
| 7,572,312 | B2 ‡ | 8/2009 | Kawata | C22C 1/05 410/10 |
| D607,091 | S ‡ | 12/2009 | Weston | D23/26 |
| 7,661,935 | B2 ‡ | 2/2010 | Kellar | F04B 1/0408 417/27 |
| D614,271 | S ‡ | 4/2010 | Weston | D23/26 |
| 7,726,026 | B1 ‡ | 6/2010 | Blume | F04B 53/102 251/35 |
| 8,210,542 | B1 ‡ | 7/2012 | Gilstad | F16J 15/324 277/53 |
| 8,221,517 | B2 ‡ | 7/2012 | Mirchandani | C22C 29/00 75/246 |
| 8,317,498 | B2 ‡ | 11/2012 | Gambier | F04B 49/243 137/51 |
| D700,682 | S ‡ | 3/2014 | Bayyouk | D23/23 |
| 8,707,853 | B1 ‡ | 4/2014 | Dille | F04B 53/14 92/165 |
| 8,790,439 | B2 ‡ | 7/2014 | Mirchandani | C22C 29/00 75/247 |
| 8,844,903 | B2 ‡ | 9/2014 | Takahashi | C22C 33/02 251/36 |
| 8,870,554 | B2 ‡ | 10/2014 | Kent | F04B 49/10 137/37 |
| 8,915,722 | B1 ‡ | 12/2014 | Blume | F04B 53/007 137/54 |
| 9,169,707 | B1 ‡ | 10/2015 | Gilstad | E21B 28/00 |
| 9,175,584 | B2 ‡ | 11/2015 | Lee | F01L 3/02 |
| 9,222,154 | B2 ‡ | 12/2015 | Dolman | C12D 5/04 |
| D748,228 | S ‡ | 1/2016 | Bayyouk | D23/26 |
| 9,273,385 | B2 ‡ | 3/2016 | Dolman | C21D 5/04 |
| D754,817 | S ‡ | 4/2016 | Dille | D23/23 |
| 9,359,921 | B2 ‡ | 6/2016 | Hashimoto | F16K 25/005 |
| 9,435,454 | B2 ‡ | 9/2016 | Blume | F16K 1/42 |
| 9,581,056 | B2 ‡ | 2/2017 | Koyama | F01L 3/02 |
| 9,631,739 | B2 ‡ | 4/2017 | Belshan | F16K 31/12 |
| D796,632 | S ‡ | 9/2017 | Bayyouk | D23/23 |
| D802,104 | S ‡ | 11/2017 | Nagahamaya | D23/26 |
| 9,822,894 | B2 ‡ | 11/2017 | Bayyouk | F16K 25/005 |
| 9,849,532 | B2 ‡ | 12/2017 | Zheng | C22C 33/0242 |
| 9,927,036 | B2 ‡ | 3/2018 | Dille | F16K 1/42 |
| 2004/0234404 | A1 ‡ | 11/2004 | Vicars | F04B 53/102 417/57 |
| 2007/0095443 | A1 ‡ | 5/2007 | Dolman | C21D 5/04 148/54 |
| 2009/0278069 | A1 ‡ | 11/2009 | Blanco | F16K 15/063 251/30 |
| 2011/0079302 | A1 ‡ | 4/2011 | Hawes | F16K 25/005 137/53 |
| 2011/0278490 | A1 ‡ | 11/2011 | Maruno et al. | F16K 15/00 251/359 |
| 2012/0286183 | A1 ‡ | 11/2012 | McCarty | F16K 1/48 251/35 |
| 2013/0017108 | A1 ‡ | 1/2013 | Kellar | B26F 3/004 417/46 |
| 2013/0020521 | A1 ‡ | 1/2013 | Byrne | F16K 1/385 251/33 |
| 2013/0037179 | A1 ‡ | 2/2013 | Dolman | C21D 5/04 148/54 |
| 2013/0181154 | A1 ‡ | 7/2013 | Robison | F16K 99/00 251/32 |
| 2013/0202458 | A1 ‡ | 8/2013 | Byrne | F04B 7/02 417/27 |
| 2013/0259733 | A1 ‡ | 10/2013 | Lee et al. | C22C 33/0285 419/10 |
| 2013/0319220 | A1 ‡ | 12/2013 | Luharuka | F04B 53/164 92/165 |
| 2014/0070127 | A1 ‡ | 3/2014 | Blume | F16K 1/42 251/35 |
| 2014/0124692 | A1 ‡ | 5/2014 | Baumann | F16K 1/38 251/33 |
| 2014/0191151 | A1 ‡ | 7/2014 | Baumann | F16K 1/465 251/359 |
| 2014/0367602 | A1 | 12/2014 | Filipow et al. | |
| 2015/0144826 | A1 ‡ | 5/2015 | Bayyouk | F16K 25/005 251/35 |

(56) References Cited

U.S. PATENT DOCUMENTS

| | | | |
|---|---|---|---|
| 2015/0219096 A1 ‡ | 8/2015 | Jain | F04B 15/02 417/44 |
| 2016/0101600 A1 ‡ | 4/2016 | Potts et al. | B23Q 5/32 74/841 |
| 2016/0238156 A1 ‡ | 8/2016 | Hubenschmidt | F16K 37/0008 |
| 2017/0002947 A1 ‡ | 1/2017 | Bayyouk | F04B 53/1087 |
| 2017/0009890 A1 ‡ | 1/2017 | Vu | F16K 1/36 |
| 2017/0059052 A1 ‡ | 3/2017 | Abouelleil | F16K 1/2263 |
| 2017/0067459 A1 ‡ | 3/2017 | Bayyouk | B23P 6/00 |
| 2017/0089228 A1 ‡ | 3/2017 | Shimada | C22C 38/42 |
| 2017/0145875 A1 ‡ | 5/2017 | Hashimoto | C22C 9/00 |
| 2017/0298932 A1 ‡ | 10/2017 | Wagner | F04B 53/1087 |
| 2017/0341148 A1 ‡ | 11/2017 | Faust et al. | B68C 1/14 54/23 |
| 2018/0298893 A1 * | 10/2018 | Buckley | F16K 25/005 |

FOREIGN PATENT DOCUMENTS

| | | | | |
|---|---|---|---|---|
| CN | 101737317 | A | ‡ | 6/2010 |
| CN | 101737317 | A | | 6/2010 |
| CN | 202001288 | U | ‡ | 10/2011 |
| CN | 202001288 | U | | 10/2011 |
| CN | 104388723 | | | 10/2016 |
| CN | 106996368 | A | ‡ | 8/2017 |
| CN | 106996368 | A | | 8/2017 |
| GB | 855956 | A | ‡ | 12/1960 .......... F04B 53/1025 |
| GB | 855956 | A | | 12/1960 |
| NL | 1020775 | C2 | ‡ | 12/2003 ............ F04B 53/102 |
| NL | 1020775 | C2 | | 12/2003 |
| WO | WO-2015077001 | A1 | ‡ | 5/2015 |
| WO | WO2015077001 | A1 | | 5/2015 |
| WO | WO-2016201020 | A1 | ‡ | 12/2016 ............. F04B 47/02 |
| WO | WO2016201020 | A1 | | 12/2016 |

OTHER PUBLICATIONS

Oct. 9, 2018 Non-Final OA.
Jun. 15, 2018 Non-Final OA.
Jul. 30, 2020 Office Action (non-US) CN App. No. 107435147A.
Jan. 26, 2021 Office Action (non-US) CN App. No. 107435147A.
Oct. 1, 2020—FinalRejection.
Mar. 29, 2022 Office Action (non-US) DE No. 102019123225.2.
Feb. 3, 2022 Foreign OA—CA No. 2965650.
May 7, 2021 Notice of Allowance—CN No. 201710337833.0.
Apr. 15, 2021 Non-Final OA—U.S. Appl. No. 16/119,513.
Feb. 23, 2021 Advisory Action Received—U.S. Appl. No. 16/119,513.
Apr. 10, 2019 Notice of Allowance.
Dec. 17, 2018 Notice of Allowance.

\* cited by examiner
‡ imported from a related application

VALVES, VALVE ASSEMBLIES AND APPLICATIONS THEREOF

RELATED APPLICATION DATA

The present application is a continuation-in-part of U.S. patent application Ser. No. 16/119,513 filed Aug. 31, 2018.

FIELD

The present invention relates to valves and valve assemblies and, in particular, to valves and valve assemblies for fluid end applications.

BACKGROUND

Valves and associated valve assemblies play a critical role in fluid ends of high pressure pumps incorporating positive displacement pistons in multiple cylinders. Operating environments of the valves are often severe due to high pressures and cyclical impact between the valve body and the valve seat. These severe operating conditions can induce premature failure and/or leakage of the valve assembly. Moreover, fluid passing through the fluid end and contacting the valve assembly can include high levels of particulate matter from hydraulic fracturing operations. Additionally, one or more acids and/or other corrosive species may be present in the fluid/particulate mixture. In hydraulic fracturing, a particulate slurry is employed to maintain crack openings in the geological formation after hydraulic pressure from the well is released. In some embodiments, alumina particles are employed in the slurry due to higher compressive strength of alumina relative to silica particles or sand. The particulate slurry can impart significant wear on contact surfaces of the valve and valve seat. Additionally, slurry particles can become trapped in the valve sealing cycle, resulting in further performance degradation of the valve assembly.

SUMMARY

In view of these disadvantages, valves and valve assemblies are described herein employing architectures which can mitigate degradative wear mechanisms, thereby prolonging life of the assembly. In one aspect, a valve comprises a head including a circumferential surface and a valve seat mating surface. Leg members extend from the head, wherein thickness of one or more of the leg members tapers in a direction away from the head to induce laminar fluid flow around the head. The valve can also comprise a seal coupled to the circumferential surface of the head. In some embodiments, an exterior surface of the seal exhibits a radius of curvature maintaining laminar fluid flow around the valve. Additionally, the seal can overlap a portion of the valve seat mating surface, in some embodiments.

In another aspect, a valve comprises a head including a circumferential surface and a valve seat mating surface. A seal is coupled to the circumferential surface, wherein the seal forms an angle with the valve seat mating surface to establish a primary seat contact area on the seal. The primary seat contact area can have a location proximate an outer circumferential surface of the seal. As described further herein, compressive stress can be concentrated at the primary seat contact area when the valve is mated to the valve seat. In some embodiments, the seal overlaps a portion of the valve seat mating surface.

In another aspect, valve assemblies are described herein. A valve assembly, in some embodiments, comprises a valve seat and a valve in reciprocating contact with the valve seat, the valve comprising a head including a circumferential surface and a valve mating surface. Leg members extend from the head, wherein thickness of one or more of the leg members tapers in a direction away from the head to induce laminar fluid flow around the head. The valve can also comprise a seal coupled to the circumferential surface of the head. In some embodiments, an exterior surface of the seal exhibits a radius of curvature maintaining laminar fluid flow around the valve. The seal can also overlap a portion of the valve seat mating face, in some embodiments. Additionally, the seal can form an angle with the valve seat mating surface to establish a primary seat contact area on the seal. In some embodiments, the primary seat contact area is located proximate an outer circumferential surface of the seal. When mated to the valve seat, the primary contact area on the seal can exhibit a concentration of compressive stress.

The valve seat, in some embodiments, can comprise a body including a first section for insertion into a fluid passageway of a fluid end and a second section extending longitudinally from the first section, the second section comprising a recess in which a wear resistant inlay is positioned. The wear resistant inlay serves as a valve mating surface. In some embodiments, the wear resistant inlay exhibits a compressive stress condition. Moreover, the first section and the second section of the valve seat can have the same outer diameter or different outer diameters. For example, the outer diameter of the second section can be larger than the outer diameter of the first section. In other embodiments, the valve seat can be formed of a single alloy composition, thereby obviating the wear resistant inlay.

In a further aspect, methods of controlling fluid flow are also described herein. In some embodiments, a method of controlling fluid flow comprises providing a valve assembly comprising a valve seat and a valve in reciprocating contact with the valve seat. The valve comprises a head including a circumferential surface and a valve seat mating surface. Leg members extend from the head, wherein thickness of one or more of the leg members tapers in a direction away from the head. The valve is moved out of contact with the valve seat to flow fluid through the assembly, wherein the one or more tapered leg members induce laminar fluid flow around the head. The valve is subsequently mated with the valve seat to stop fluid flow through the valve. In some embodiments, a seal is coupled to the circumferential surface of the head. The seal can have a radius of curvature maintaining laminar fluid flow around the valve.

These and other embodiments are further described in the following detailed description.

DETAILED DESCRIPTION

Figure 1:
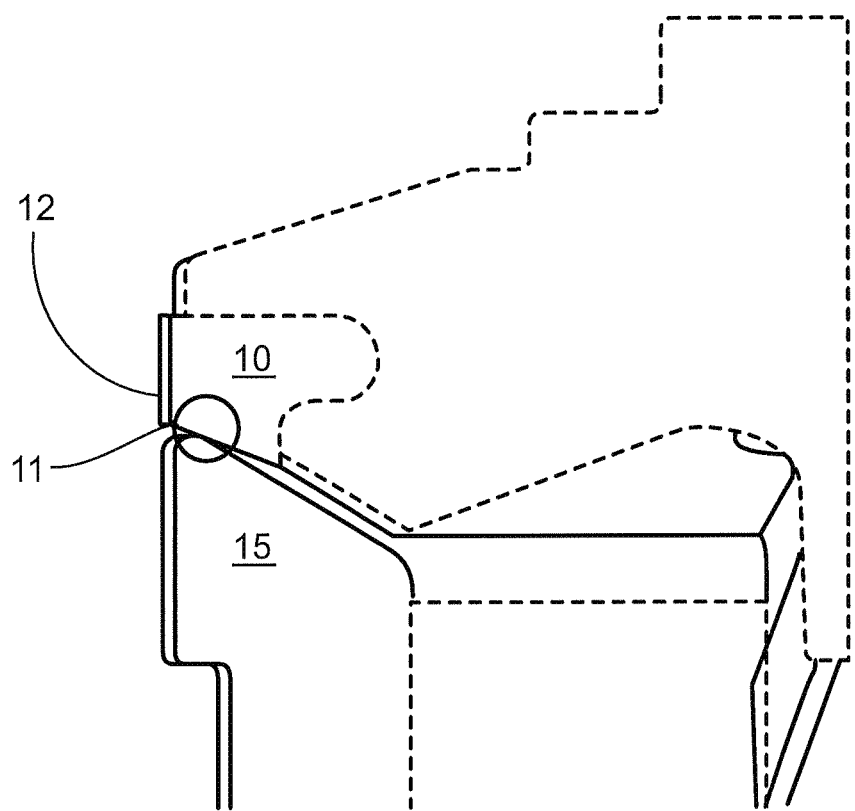
FIG. 1 illustrates a primary seat contact area of a seal engaging a valve seat according to some embodiments.

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present invention. Numerous modifications and adaptations will be readily apparent to those of skill in the art without departing from the spirit and scope of the invention.

I. Valves

Valves are described herein employing architectures which can mitigate degradative wear pathways, thereby prolonging life of the valves. In one aspect, a valve comprises a head including a circumferential surface and a valve seat mating surface. Leg members extend from the head, wherein thickness of one or more of the leg members tapers in a direction away from the head to induce laminar fluid flow around the head. Leg members can have any taper angle consistent with inducing laminar fluid flow around the head. For example, one or more of the legs can have a taper angle of 1-10 degrees. In other embodiments, leg taper angle can be 2-5 degrees. Leg members of the valve can exhibit the same taper angle or differing taper angles. Taper angle of each leg member may be individually adjusted according to the fluid flow environment of the valve. Alternatively, taper angles of the leg members can be adjusted in conjunction with one another to induce laminar fluid flow around the head. Leg members may also comprise rounded and/or flat surfaces. One or more edges of the leg members, for example, can be rounded.

The valve can comprise any desired number of leg members. Number of leg members can be selected according to several considerations including, but not limited to, the fluid flow environment of the valve and structural parameters of the assembly incorporating the valve. A valve for, can comprise 3-6 leg members. Leg members of the valve can exhibit equidistant radial spacing or offset, in some embodiments. In other embodiments, radial spacing between the leg members can be variable.

The leg members extend from the bottom surface of the valve head. An intermediate body member or trunk may reside between the bottom surface of the head and leg members. The leg members may extend radially from the intermediate body member. The leg members, in some embodiments, extend radially at an angle of 45 degrees to 80 degrees relative to the longitudinal axis of the valve. In some embodiments, the leg members extend radially at an angle of 60-70 degrees relative the longitudinal axis of the valve. Each of the leg members can radially extend at the same angle. Alternatively, leg members can radially extend at different angles relative to the longitudinal axis. Additionally, a transition region between the bottom surface of the valve head and intermediate body member can exhibit a radius of curvature. The radius of curvature can range from 0.25 mm to 5 mm. In some embodiments, the transition region radius of curvature ranges from 0.5 mm to 2 mm. The radius of curvature can assist with maintaining laminar fluid flow around the head.

The valve can further comprise a seal coupled to the circumferential surface of the head. In some embodiments, the circumferential surface defines an annular groove engaging the seal, the annular groove comprising a top surface and bottom surface. The top surface of the annular groove can extend radially beyond the bottom surface. Additionally, the bottom surface of the annular groove can transition to the valve seat mating surface. The transition region between the groove bottom surface and the valve seat mating surface, in some embodiments, has a radius of curvature less than the annular groove radius of curvature.

An exterior surface of the seal can have a radius of curvature maintaining laminar fluid flow around the valve head. Therefore, the tapered leg members can work in conjunction with the seal and intermediate body member to provide laminar fluid flow around the valve head. In some embodiments, the seal overlaps a portion of the valve seat mating surface. In other embodiments, the seal terminates at an end wall of the valve seat mating surface and does not overlap a portion of the valve seat mating surface. The seal can comprise any material(s) consistent with the sealing of valve assemblies in high pressure fluid environments, such as those encountered in fluid ends for hydraulic fracturing operations. In some embodiments, the seal comprises a polymeric material, such as polyurethane or polyurethane derivative. In other embodiments, the seal may comprise one or more elastomeric materials alone or in combination with other polymeric materials.

Notably, the seal can form an angle ($\alpha$) with the valve seat mating surface. The angle ($\alpha$) formed with the valve seat mating surface can establish a primary area on the seal for contacting a valve seat. Location of this primary seat contact area can be proximate an outer circumferential surface of the seal. Radial location of the primary seat contact area can be varied by varying the angle ($\alpha$) formed by the seal and the valve seat mating surface. The primary seat contact area, for example, can be moved radially outward on the seal by increasing the angle or moved radially inward by decreasing the angle. The angle ($\alpha$) between the seal and the valve seat mating surface, for example, can range from 5-30 degrees. In some embodiments, a value of a is selected from Table I.

TABLE I

| Value of $\alpha$ (degrees) |
| --- |
| 5-25 |
| 10-20 |
| 8-15 |
| 12-17 |

The primary seat contact area is generally the first area of the seal to contact the valve seat during operation of a valve assembly employing the valve. Compressive stresses can be the highest or concentrated in the primary seat contact area when the valve is mated to the valve seat. By establishing a primary seat contact area, it possible to control the stress release and/or dissipation properties of the seal. In some embodiments, for example, the primary seat contact area is located proximate the outer circumferential surface of the seal. By occupying this outward radial position, the primary seat contact area can dissipate stress concentrations or risers quickly, due to the short energy transfer distance to outer surface of the seal. In this way, stress risers at interior radial locations are avoided, and seal lifetime is enhanced. This technical solution is counter-intuitive based on general stress management principles where stress risers should be avoided, and stress spread evenly over the entire area of the seal.

As described herein, the valve comprises a valve seat mating surface. The valve seat mating surface contacts the valve seat when a valve assembly employing the valve is in the closed position. In some embodiments, the valve seat mating surface comprises the same alloy forming the remainder of the valve. Alternatively, the valve seat mating surface can comprise a wear resistant cladding. The wear resistant cladding, for example, can comprise a wear resistant alloy. Suitable wear resistant alloys include cobalt-based alloys and nickel-based alloys. Cobalt-based alloy of the cladding have compositional parameters selected from Table II, in some embodiments.

TABLE II

Cobalt-based alloys

| Element | Amount (wt. %) |
| --- | --- |
| Chromium | 5-35 |
| Tungsten | 0-35 |
| Molybdenum | 0-35 |
| Nickel | 0-20 |
| Iron | 0-25 |
| Manganese | 0-2 |
| Silicon | 0-5 |
| Vanadium | 0-5 |
| Carbon | 0-4 |
| Boron | 0-5 |
| Cobalt | Balance |

In some embodiments, cobalt-based alloy cladding has compositional parameters selected from Table III.

TABLE III

Co-Based Alloy Cladding

| Co-Based Alloy Cladding | Compositional Parameters (wt. %) |
| --- | --- |
| 1 | Co—(15-35)% Cr—(0-35)% W—(0-20)% Mo—(0-20)% Ni—(0-25)% Fe—(0-2)% Mn—(0-5)% Si—(0-5)% V—(0-4)% C—(0-5)% B |
| 2 | Co—(20-35)% Cr—(0-10)% W—(0-10)% Mo—(0-2)% Ni—(0-2)% Fe—(0-2)% Mn—(0-5)% Si—(0-2)% V—(0-0.4)% C—(0-5)% B |
| 3 | Co—(5-20)% Cr—(0-2)% W—(10-35)% Mo—(0-20)% Ni—(0-5)% Fe—(0-2)% Mn—(0-5)% Si—(0-5)% V—(0-0.3)% C—(0-5)% B |
| 4 | Co—(15-35)% Cr—(0-35)% W—(0-20)% Mo—(0-20)% Ni—(0-25)% Fe—(0-1.5)% Mn—(0-2)% Si—(0-5)% V—(0-3.5)% C—(0-1)% B |
| 5 | Co—(20-35)% Cr—(0-10)% W—(0-10)% Mo—(0-1.5)% Ni—(0-1.5)% Fe—(0-1.5)% Mn—(0-1.5)% Si—(0-1)% V—(0-0.35)% C—(0-0.5)% B |
| 6 | Co—(5-20)% Cr—(0-1)% W—(10-35)% Mo—(0-20)% Ni—(0-5)% Fe—(0-1)% Mn—(0.5-5)% Si—(0-1)% V—(0-0.2)% C—(0-1)% B |

Nickel-based alloy cladding, in some embodiments, can have compositional parameters selected from Table IV.

TABLE IV

Nickel-based alloys

| Element | Amount (wt. %) |
| --- | --- |
| Chromium | 0-30 |
| Molybdenum | 0-28 |
| Tungsten | 0-15 |
| Niobium | 0-6 |
| Tantalum | 0-6 |
| Titanium | 0-6 |
| Iron | 0-30 |
| Cobalt | 0-15 |
| Copper | 0-50 |
| Carbon | 0-2 |
| Manganese | 0-2 |
| Silicon | 0-10 |
| Phosphorus | 0-10 |
| Sulfur | 0-0.1 |
| Aluminum | 0-1 |
| Boron | 0-5 |
| Nickel | Balance |

In some embodiments, for example, nickel-based alloy cladding comprises 18-23 wt. % chromium, 5-11 wt. % molybdenum, 2-5 wt. % total of niobium and tantalum, 0-5 wt. % iron, 0.1-5 wt. % boron and the balance nickel. Alternatively, nickel-based alloy cladding comprises 12-20 wt. % chromium, 5-11 wt. % iron, 0.5-2 wt. % manganese, 0-2 wt. % silicon, 0-1 wt. % copper, 0-2 wt. % carbon, 0.1-5 wt. % boron and the balance nickel. Further, nickel-based alloy cladding can comprise 3-27 wt. % chromium, 0-10 wt. % silicon, 0-10 wt. % phosphorus, 0-10 wt. % iron, 0-2 wt. % carbon, 0-5 wt. % boron and the balance nickel.

Cobalt-based cladding and/or nickel-based cladding can be produced by sintered powder metallurgy techniques, in some embodiments. In other embodiments, cobalt-based claddings and nickel-based cladding can be produced according to laser cladding or plasma transferred are techniques. Additionally, wear resistant claddings for the valve mating surface can have any desired thickness. For example, cladding thickness can be selected from Table V.

TABLE V

| Cladding Thickness |
| --- |
| ≥50 μm |
| ≥100 μm |
| 100 μm-200 μm |
| 500 μm-1 mm |

Co-based or Ni-based claddings can further comprise hard particles. In such embodiments, hard particles become trapped in alloy matrix formed during sintering or melting of powder alloy. Suitable hard particles can comprise particles of metal carbides, metal nitrides, metal carbonitrides, metal borides, metal silicides, cemented carbides, cast carbides, intermetallic compounds or other ceramics or mixtures thereof. In some embodiments, metallic elements of hard particles comprise aluminum, boron, silicon and/or one or more metallic elements selected from Groups IVB, VB, and VIB of the Periodic Table. Groups of the Periodic Table described herein are identified according to the CAS designation.

In some embodiments, for example, hard particles comprise carbides of tungsten, titanium, chromium, molybdenum, zirconium, hafnium, tantalum, niobium, rhenium, vanadium, boron or silicon or mixtures thereof. Hard particles can also comprise nitrides of aluminum, boron, silicon, titanium, zirconium, hafnium, tantalum or niobium, including cubic boron nitride, or mixtures thereof. Additionally, in some embodiments, hard particles comprise borides such as titanium di-boride, $B_4C$ or tantalum borides or silicides such as $MoSi_2$ or $Al_2O_3$—SiN. Hard particles can comprise crushed cemented carbide, crushed carbide, crushed nitride, crushed boride, crushed silicide, or other ceramic particle reinforced metal matrix composites or combinations thereof. Crushed cemented carbide particles, for example, can have 2 to 25 weight percent metallic binder. Additionally, hard particles can comprise intermetallic compounds such as nickel aluminide.

Hard particles can have any size not inconsistent with the objectives of the present invention. In some embodiments, hard particles have a size distribution ranging from about 0.1 μm to about 1 mm. Hard particles can also demonstrate bimodal or multi-modal size distributions. Hard particles can have any desired shape or geometry. In some embodiments, hard particles have spherical, elliptical or polygonal geometry. Hard particles, in some embodiments, have irregular shapes, including shapes with sharp edges.

Hard particles can be present in alloy claddings described herein in any amount not inconsistent with the objectives of the present invention. Hard particle loading of a cladding can vary according to several considerations including, but not limited to, the desired hardness, abrasion resistance and/or toughness of the cladding. In some embodiments, hard particles are present in a cladding in an amount of 0.5 weight percent to 40 weight percent. Hard particles, in some embodiments, are present in a cladding in an amount of 1 weight percent to 20 weight percent or 5 weight percent to 20 weight percent.

The cladding, in some embodiments, is directly applied the valve seat mating area of the valve. As described herein, the cladding can be applied by powder metallurgical techniques, including sintering. In other embodiments, the cladding can be applied by laser cladding or plasma transferred arc. Alternatively, the cladding can be provided as an inlay. The cladding, for example, can be prefabricated to the desired dimensions as an inlay, wherein the inlay is disposed in a recess on the valve body to provide the valve seat mating surface. An inlay can have any of the compositional properties described above for the valve seat mating surface, including Co-based alloys, Ni-based alloys and/or hard particles. A valve seat mating inlay can be press-fit and/or metallurgically bonded to the valve body via braze alloy.

In some embodiments, the valve seat mating surface comprises sintered cemented carbide. The sintered cemented carbide can be applied as a cladding layer to the valve seat mating surface. Alternatively, the sintered cemented carbide can be applied as an inlay on the valve head. A sintered cemented carbide inlay, for example, can be separately fabricated and brazed or press fit to the valve head. In other embodiments, the sintered cemented carbide inlay is attached to a base or substrate, and the base or substrate is coupled to the valve head. The inlay can be coupled to the base or substrate by any desired method. The inlay, for example, can be brazed or mechanically fit to the substrate. Additionally, the base or substrate can be coupled to the valve head via a variety of mechanisms including, but not limited to, welding, mechanical locking such as press fitting or shrink fitting, and/or use of an adhesive. The valve head may comprise a recess or other structure for receiving the sintered cemented carbide inlay. In some embodiments, the sintered cemented carbide inlay is provided as a single, monolithic piece. The sintered cemented carbide inlay may also be provided as a plurality of radial sections. Any number of radial sections is contemplated. Providing the sintered cemented carbide inlay as a plurality of radial sections can prolong inlay life, in some embodiments, by precluding crack propagation and/or other failure modes that can induce premature failure of inlays with single piece construction. Degradation and/or failure of one radial section, for example, may not have any bearing on performance of other radial sections of the inlay.

Sintered cemented carbide of the inlay forming the valve seat mating surface can comprise tungsten carbide (WC). In some embodiments, WC can be present in the sintered carbide in an amount of at least 70 weight percent or in an amount of at least 80 weight percent. Additionally, metallic binder of the cemented carbide can comprise cobalt or cobalt alloy. Cobalt, for example, can be present in the sintered cemented carbide in an amount ranging from 3 weight percent to 30 weight percent. In some embodiments, cobalt is present in the sintered cemented carbide in an amount ranging from 5-12 weight percent or from 6-10 weight percent. Further, the sintered cemented carbide may exhibit a zone of binder enrichment beginning at and extending inwardly from the surface of the substrate. Sintered cemented carbide of the cladded valve mating surface and/or inlay can also comprise one or more additives such as, for example, one or more of the following elements and/or their compounds: titanium, niobium, vanadium, tantalum, chromium, zirconium and/or hafnium. In some embodiments, titanium, niobium, vanadium, tantalum, chromium, zirconium and/or hafnium form solid solution carbides with WC of the sintered cemented carbide. In such embodiments, the sintered carbide can comprise one or more solid solution carbides in an amount ranging from 0.1-5 weight percent.

Sintered cemented carbide of the cladded valve mating surface or inlay can have surface roughness ($R_a$) of 1-15 m, in some embodiments. Surface roughness (Ra) of the sintered cemented carbide can also be 5-10 μm. Surface roughness of sintered cemented carbide forming the valve mating surface may be obtained via mechanical working including, but not limited to, grinding and/or blasting techniques.

Moreover, sintered cemented carbide of the valve mating surface can exhibit a compressive stress condition of at least 500 MPa or at least 1 GPa.

Figure 2:
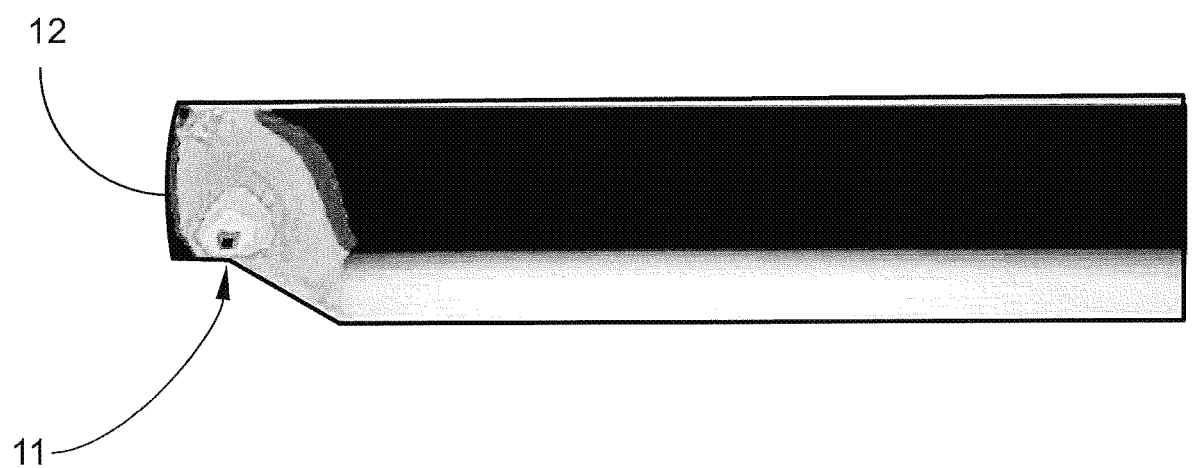
FIG. 2 illustrates a stress profile of a valve seal in contact with a valve seat according to some embodiments.

FIG. 1 illustrates the primary seat contact area of a seal engaging a valve seat according to some embodiments. As illustrated in FIG. 1, the primary seat contact area 11 (circled) is located proximate or adjacent to the outer circumferential surface 12 of the seal 10. FIG. 2 illustrates a stress profile of the seal 10 when in contact with the seat 15. Compressive stress concentration is highest in the primary seat contact area 11, and can be quickly dissipated through the neighboring exterior surface 12 of the seal 10.

Figure 3:
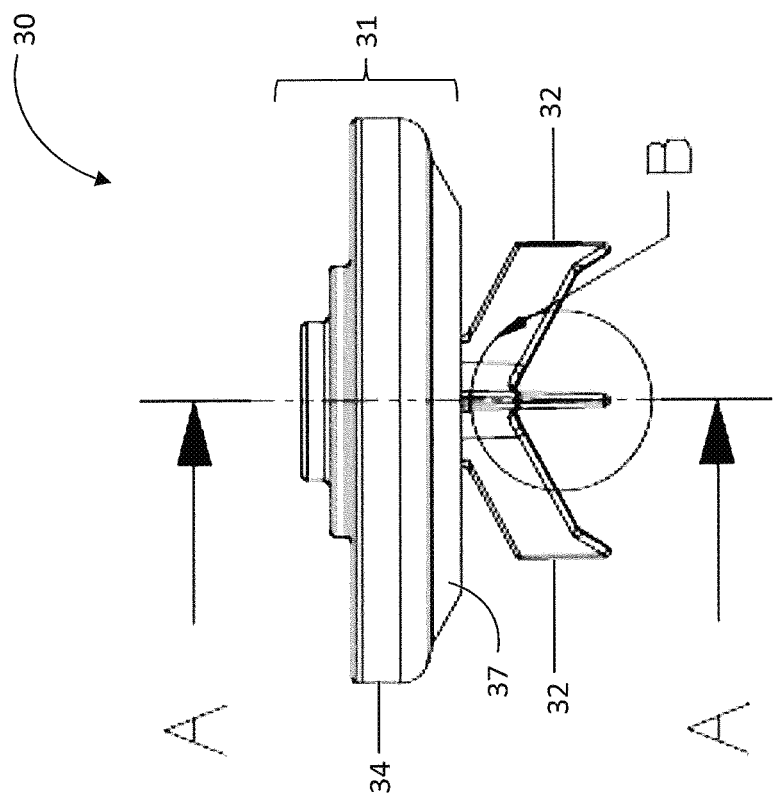
FIG. 3 illustrates an elevational view of a valve according to some embodiments.
Figure 4:
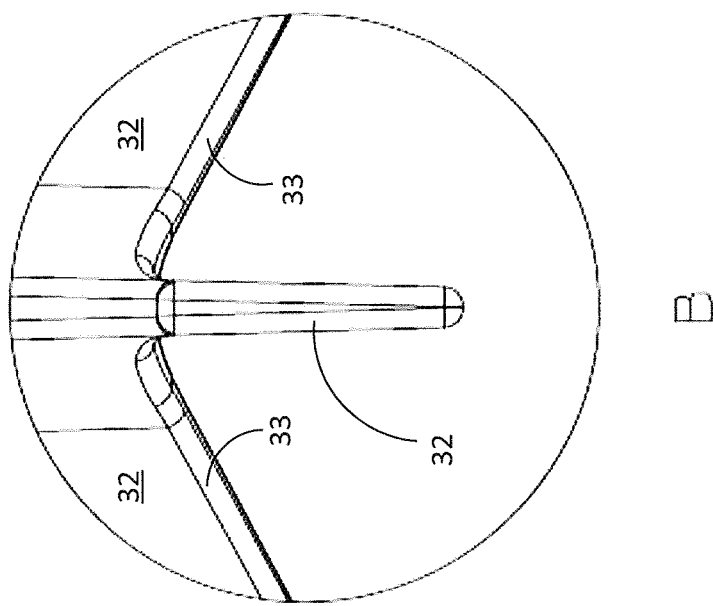
FIG. 4 is sectional view B of FIG. 3.
Figure 5:
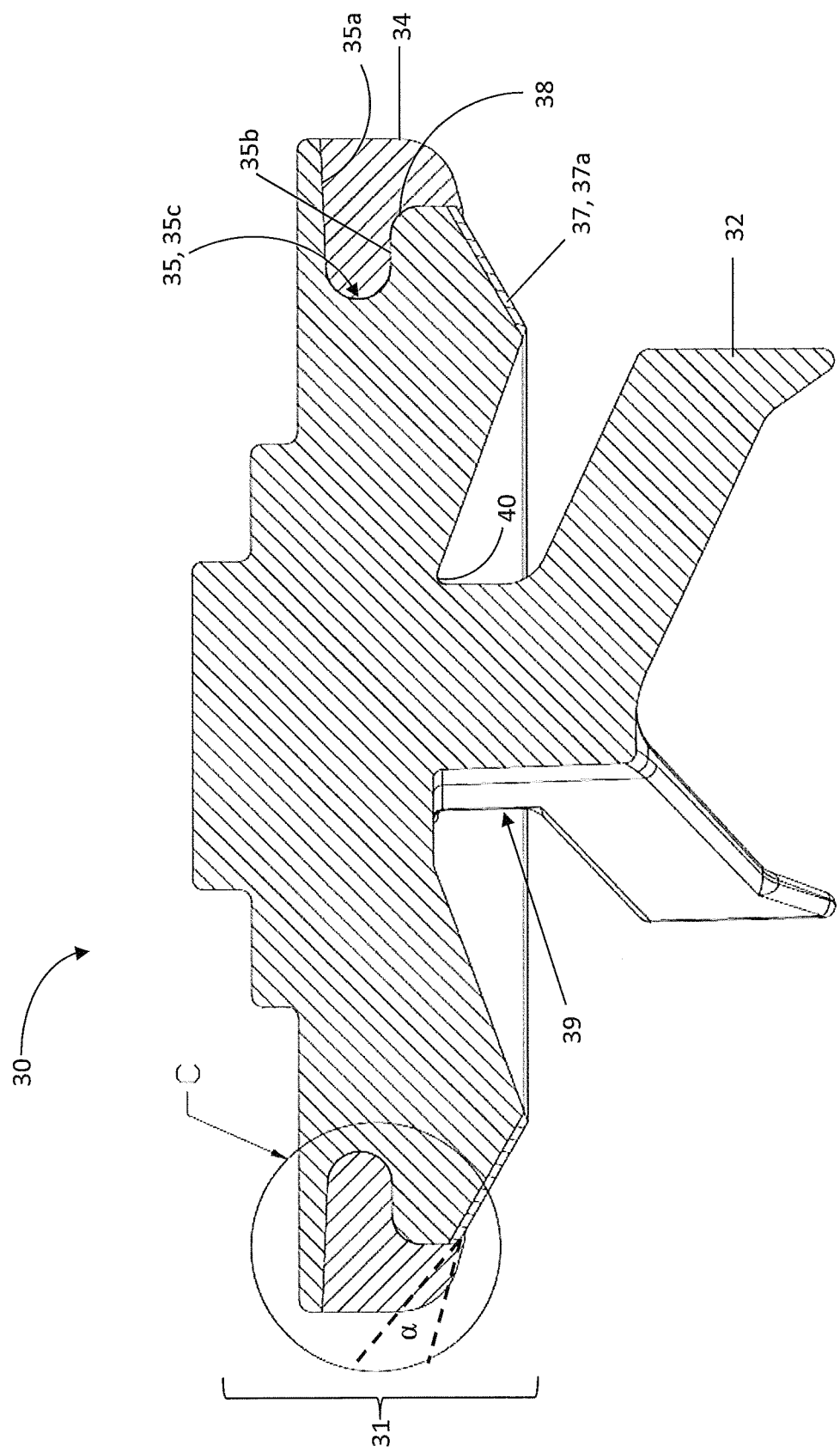
FIG. 5 is a cross-sectional view of the valve of FIG. 3 along the A-A line.
Figure 6:
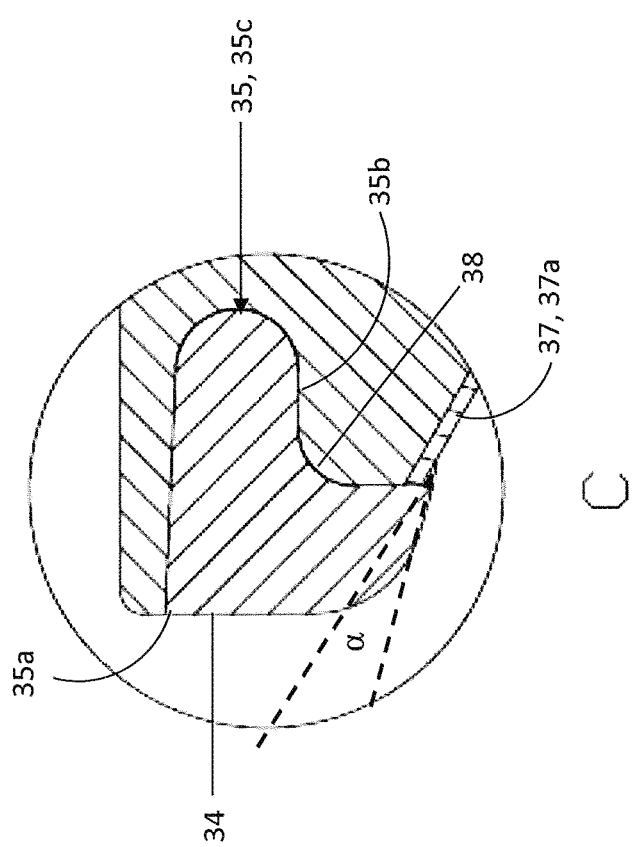
FIG. 6 is sectional view C of FIG. 5.
Figure 7C:
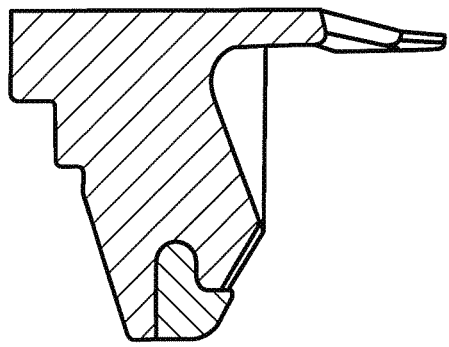
FIGS. 7A-7F illustrate various cross-sectional seal geometries according to some embodiments.
Figure 7F:
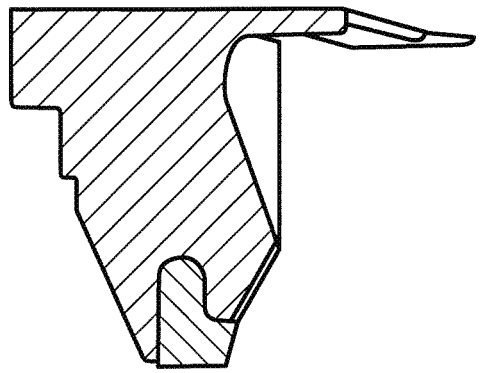
Figure 7B:
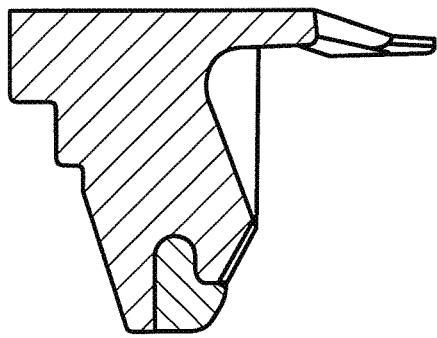
Figure 7E:
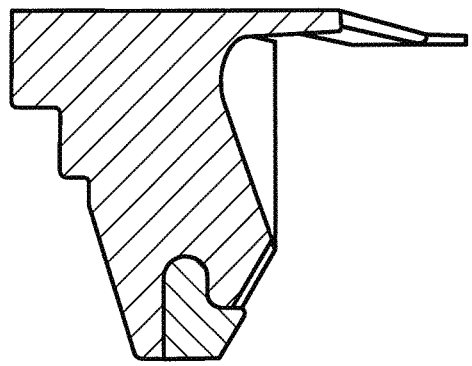
Figure 7A:
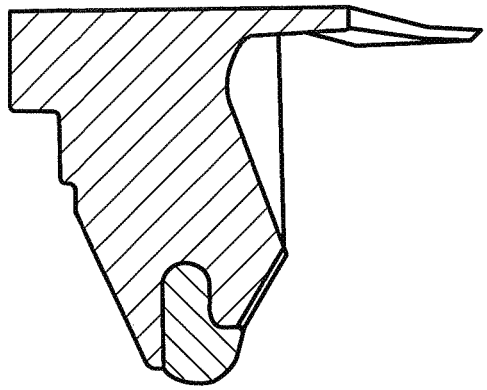
Figure 7D:
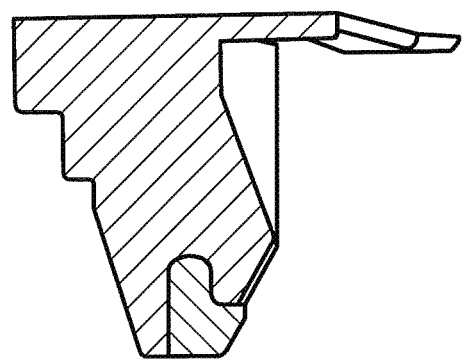

FIG. 3 illustrates an elevational view of a valve according to some embodiments. The valve 30 comprises a head 31 and leg members 32 extending from the head 31. In the embodiment of FIG. 3, three leg members 32 are present having equidistant radial spacing. Thickness of each leg member 32 tapers in a direction away from the head 31 to produce laminar fluid flow around the head 31. FIG. 4 is sectional view B of FIG. 3. The taper of the leg member 32 is evident along with rounded edges 33 of the leg members 32. The valve of FIG. 3 also comprises a seal 34 coupled to the outer circumferential surface of the head 31. FIG. 5 is a cross-sectional view of the valve taken along the A-A line of FIG. 3. In the cross-sectional view, the seal 34 engages an annular groove 35 having a top surface 35a and a bottom surface 35b. A transition region 35c having radius of curvature $R_1$ connects the top 35a and bottom 35b surfaces. Moreover, the top surface 35a extends radially beyond the bottom surface 35b. In the embodiment of FIG. 5, the bottom surface 35b transitions to the valve seat mating surface 37 via a transition region 38 having a radius of curvature $R_2$. In some embodiments, $R_1$ is greater than $R_2$. As described above, the valve seat mating surface 37 comprises a wear resistant cladding 37a. In the embodiment of FIG. 3, the valve seat mating surface 37 exhibits frustoconical geometry. The seal 34 forms an angle ($\alpha$) with the valve seat mating surface 37. The angle ($\alpha$) can establish a primary seat contact area for the seal 34, as described above. FIG. 6 is Sectional view C of FIG. 5 providing magnified detail of the annual groove 35 and associated seal 34. The exterior surface of the seal 34a can exhibit a radius of curvature $R_3$ for maintaining laminar fluid flow around the head 31.

Referring once again to FIG. 5, the leg members 32 extend radially from an intermediate body member 39. A curved transition region 40 having radius of curvature $R_3$ is established between the bottom surface of the head 31 and the intermediate body member 39. This transition region 40 can have a radius of curvature assisting laminar fluid flow around the head 31. In other embodiments, the transition region 40 is not curved. FIGS. 7A-7F illustrate cross-sectional views of various seal geometries and designs according to some embodiments.

Figure 8:
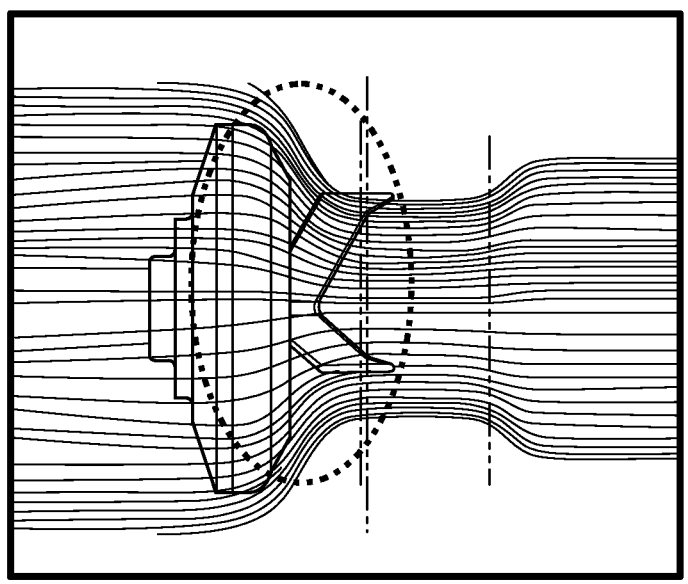
FIG. 8 is fluid flow modeling of the valve in FIGS. 3-6 illustrating laminar flow around the valve head according to some embodiments.
Figure 8:
Figure 8:
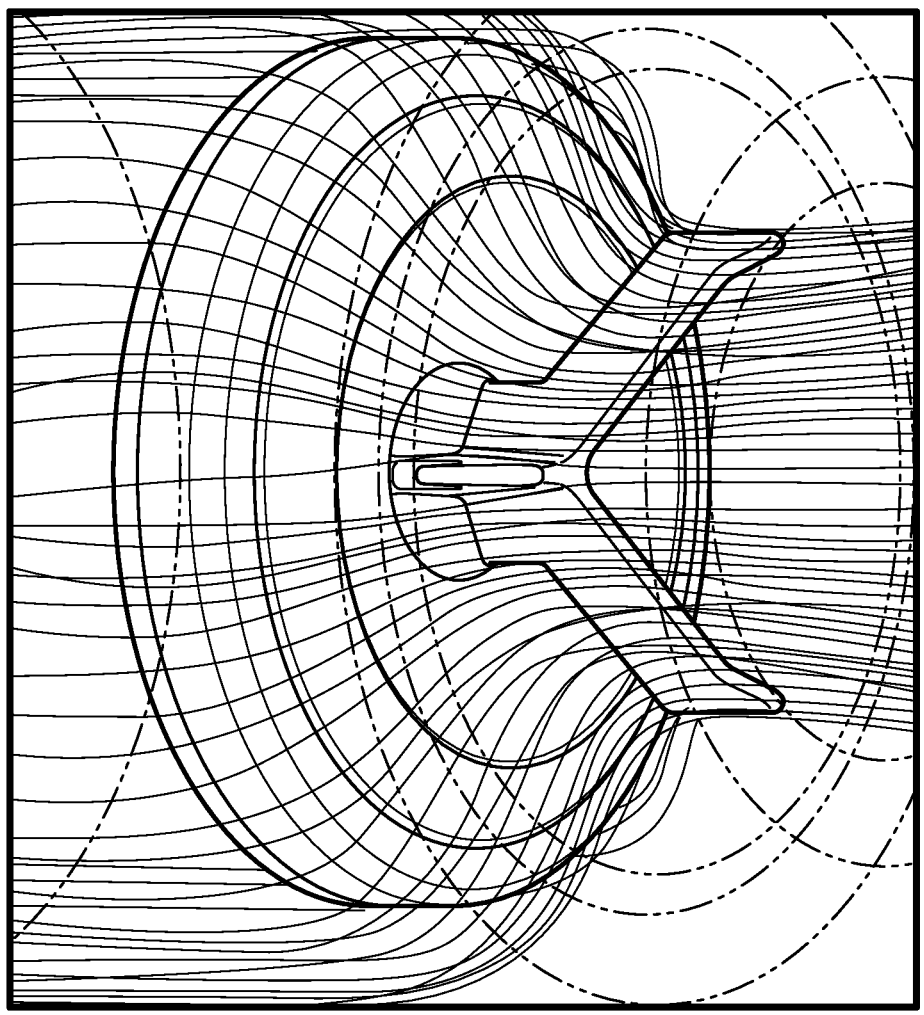

FIG. 8 illustrates fluid flow modeling of the valve illustrated in FIGS. 3-6. As illustrated in FIG. 8, the leg members 32 induce laminar fluid flow around the head 31. The curved transition region 40 and the curved exterior surface 34a of the seal 34 assist in maintaining the laminar fluid flow.

In another aspect, a valve comprises a head including a circumferential surface and a valve seat mating surface. A seal is coupled to the circumferential surface and forms an angle with the valve seat mating surface to establish a primary seat contact area on the seal. The primary seat contact area can be located proximate an outer circumferential surface of the seal. In some embodiments, the seal overlaps a portion of the valve seat mating surface. The valve and associated primary seat contact area can have any composition, properties and/or function described above in this Section I. The valve and seal, for example, can exhibit the architecture and function as described in FIGS. 1-8 herein.

II. Valve Assemblies

In another aspect, valve assemblies are described herein. A valve assembly, in some embodiments, comprises a valve seat and a valve in reciprocating contact with the valve seat, the valve comprising a head including a circumferential surface and a valve mating surface. Leg members extend from the head, wherein thickness of one or more of the leg members tapers in a direction away from the head to induce laminar fluid flow around the head. The valve can also comprise a seal coupled to the circumferential surface of the head. In some embodiments, an exterior surface of the seal exhibits a radius of curvature maintaining laminar fluid flow around the valve. The seal can also overlap a portion of the valve seat mating face, in some embodiments. Additionally, the seal can form an angle with the valve seat mating surface to establish a primary seat contact area on the seal. In some embodiments, the primary seat contact area is located proximate an outer circumferential surface of the seal. When mated to the valve seat, the primary contact area on the seal can exhibit a concentration of compressive stress. Valves for use in valve assemblies can have any architecture, properties and/or composition described in Section I above. The valve, for example, can exhibit architecture and function as described in FIGS. 1-8 herein.

The valve seat, in some embodiments, can comprise a body including a first section for insertion into a fluid passageway of the fluid end and a second section extending longitudinally from the first section, the second section comprising a recess in which a wear resistant inlay is positioned, wherein the wear resistant inlay comprises a valve mating surface. In some embodiments, the wear resistant inlay exhibits a compressive stress condition. Moreover, the first section and the second section of the valve seat can have the same outer diameter or different outer diameters. For example, the outer diameter of the second section can be larger than the outer diameter of the first section. In other embodiments, the valve seat can be formed of a single alloy composition, thereby obviating the wear resistant inlay.

Figure 9:
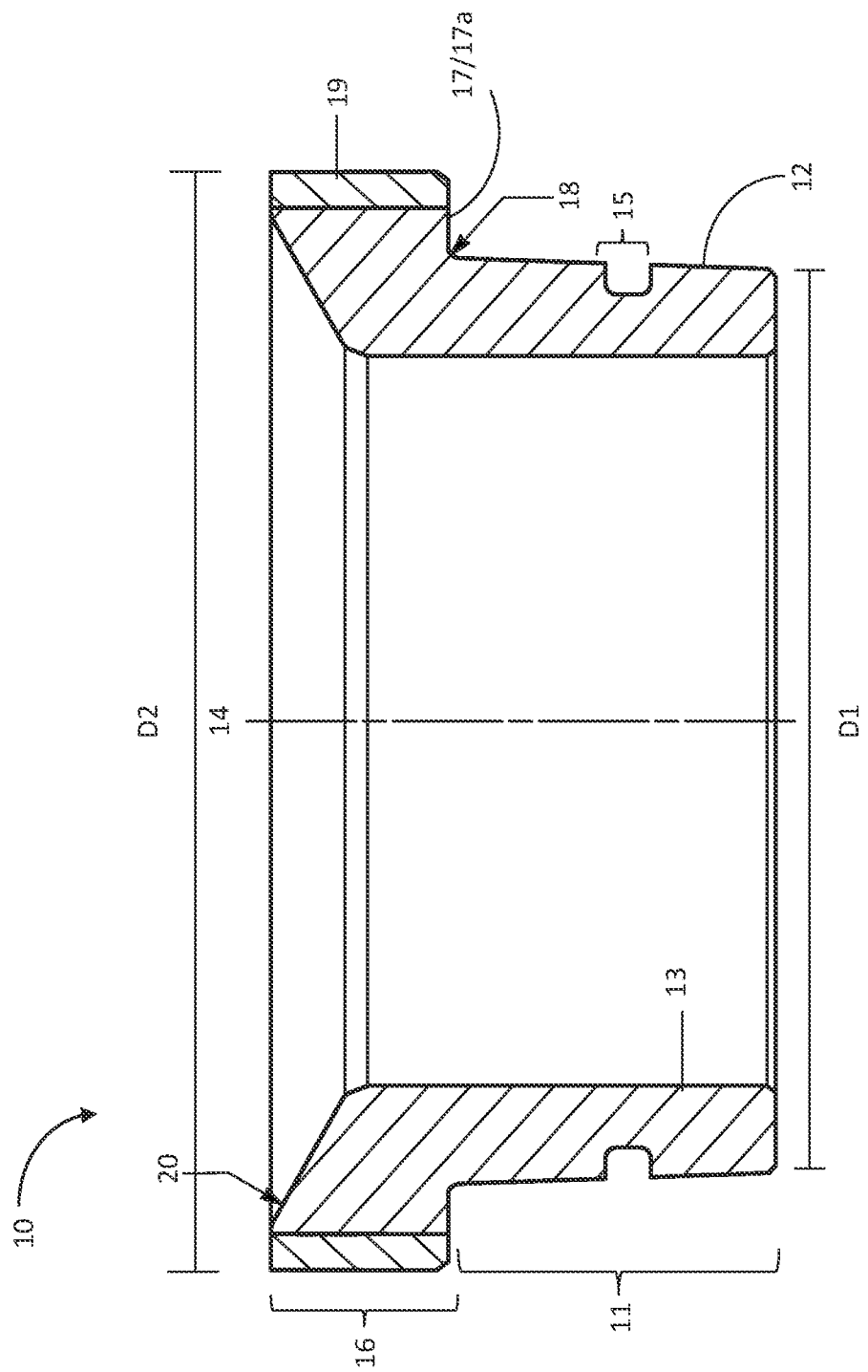
FIG. 9 is a cross-sectional schematic of a valve seat according to some embodiments.

Referring now to FIG. 9, a valve seat 10 comprises a first section 11 for insertion into a fluid passageway of the fluid end. In the embodiment of FIG. 9, the first section 11 comprises a tapered outer surface 12 and an inner surface 13 that is generally parallel to the longitudinal axis 14 of the seat 10. In some embodiments, the inner surface 13 may also be tapered. The tapered outer surface 12 can present a variable outer diameter D1 of the first section 11. Alternatively, the outer surface 12 of the first section 11 is not tapered and remains parallel to the longitudinal axis 14. In such an embodiment, the first section 11 has a static outer diameter D1. The outer surface 12 of the first section may also comprise one or more recesses 15 for receiving an O-ring. One or more O-rings can aid in sealing with the fluid passageway wall.

Figure 10:
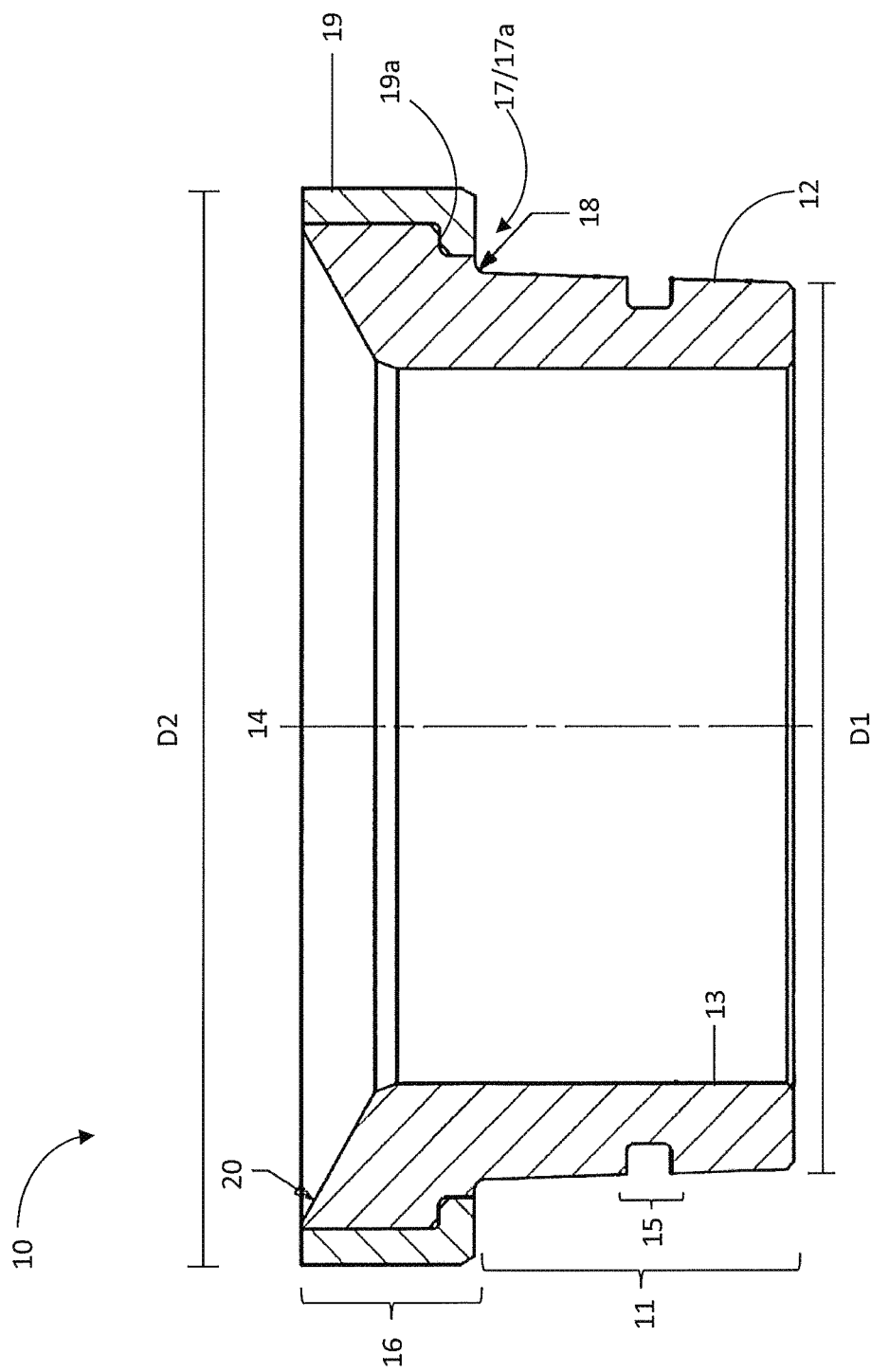
FIG. 10 is a cross-sectional schematic of a valve seat according to some embodiments.

A second section 16 extends longitudinally from the first section 11. The second section has an outer diameter D2 that is larger than outer diameter D1 of the first section 11. In the embodiment of FIG. 9, a ring 19 encasing the second section 16 forms part of the outer diameter D2. In some embodiments, the ring 19 can account for the second section 16 having an outer diameter greater than the first section 11. In such embodiments, the body of the valve seat can be cylindrical, where the addition of the ring 19 provides the second section 16 the larger outer diameter D2. Alternatively, as illustrated in FIGS. 9 and 10, the second section 16 independent of the ring 19 can have an outer diameter D2 greater than the outer diameter D1 of the first section.

A shoulder 17 is formed by the larger outer diameter D2 of the second section 16. In the embodiment of FIG. 9, the shoulder surface 17a is generally normal to the longitudinal axis 14 of the valve seat 10. In other embodiments, the shoulder surface 17a can taper and/or form an angle with the longitudinal axis having a value of 5-70 degrees. Design of the shoulder 17 can be selected according to several considerations including, but not limited to, entrance geometry of the fluid passageway and pressures experienced by the seat when in operation. In some embodiments, for example, taper of the shoulder can be set according to curvature of the fluid passageway entrance engaging the shoulder. The first section 11 transitions to the second section 16 at a curved intersection 18. The curved intersection can have any desired radius. Radius of the curved intersection, in some embodiments, can be 0.05 to 0.5 times the width of the shoulder. In other embodiments, a curved transition is not present between the first and second sections. Moreover, in some embodiments, the outer diameter (D2) of the second section (16) is equal or substantially equal to the outer diameter (D1) of the first section (11) (e.g. D1=D2).

The second section 16 also comprises a frusto-conical valve mating surface 20, wherein the second section 16 is encased by a ring 19. In the embodiment of FIG. 9, the ring 19 is coupled to the outer surface of the second section 16 in a concentric arrangement. The ring 19 imparts a compressive stress condition to the second section 16. By placing the second section 16 in compressive stress, the ring 19 can assist in balancing or equalizing stress between the first section 11 and second section 16 when the first section 11 is press fit into a fluid passageway of the fluid end. A compressive stress condition can also inhibit crack formation and/or propagation in the second section 16, thereby enhancing lifetime of the valve seat and reducing occurrences of sudden or catastrophic seat failure. A compressive stress condition may also enable the use of harder and more brittle materials in the second section 16, such as harder and more wear resistant grades of cemented carbide forming the valve mating surface.

In the embodiment of FIG. 9, the ring 19 forms a planar interface with the outer surface or perimeter of the second section 16. In other embodiments, the ring 19 may comprise one or more protrusions or flanges residing on the inner annular surface of the ring 19. A protrusion or flange on the inner ring surface may fit into a recess or groove along the perimeter of the second section 16. This structural arrangement can assist in proper engagement between the ring 19 and second section 16. This structural arrangement may also assist in retaining the second section 16 within the ring 19 during operation of the fluid end. In a further embodiment, the second section 16 can comprise one or more protrusions of flanges for engaging one or more recesses in the interior annular surface of the ring 19.

Figure 11:
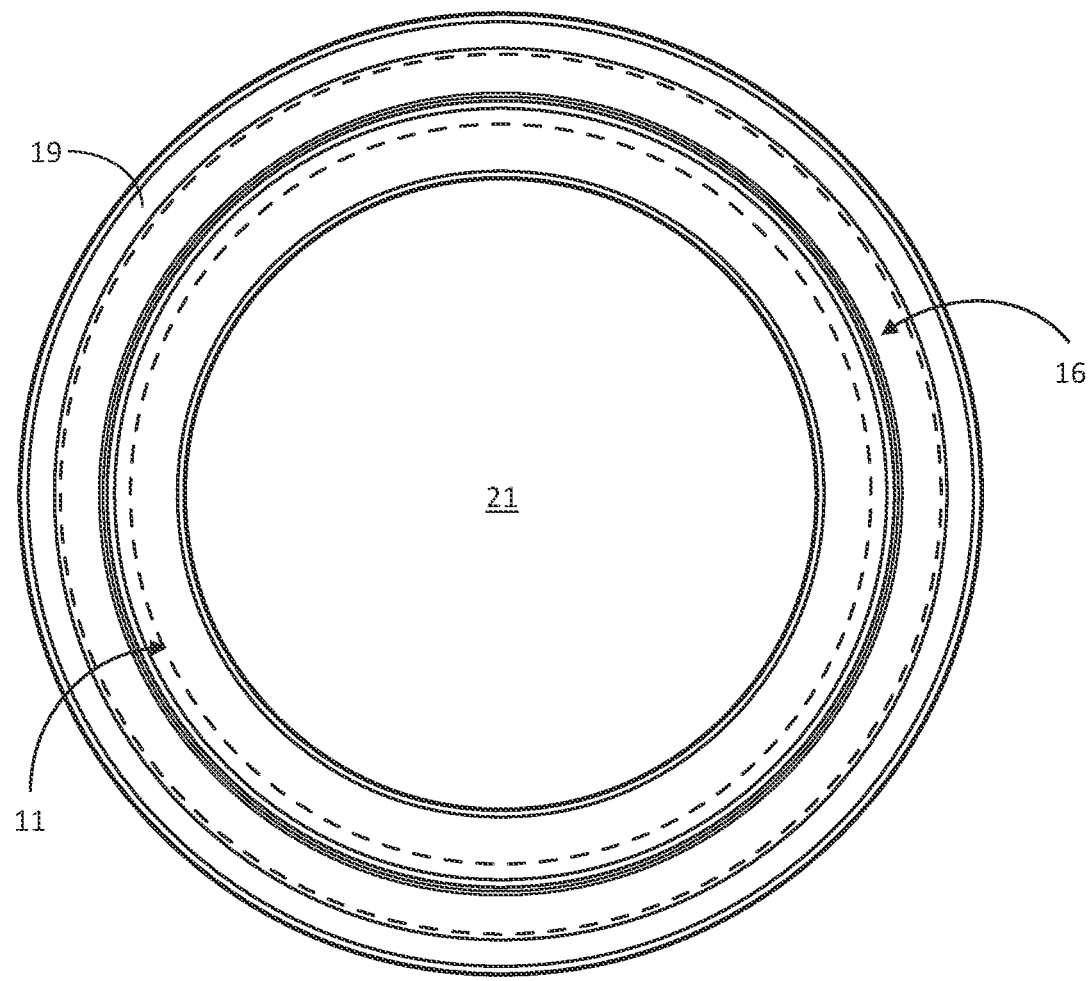
FIG. 11 is a bottom plan view of a valve seat according to some embodiments.
Figure 12:
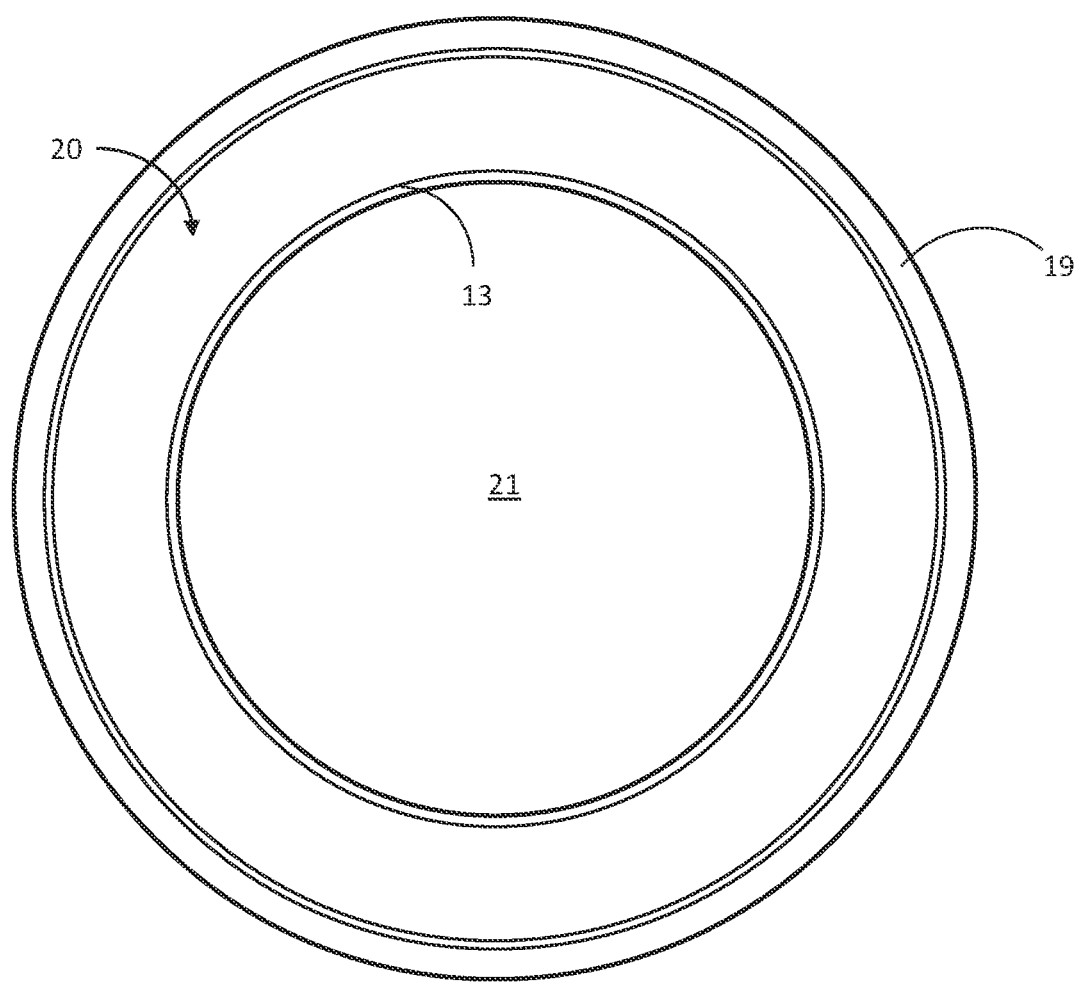
FIG. 12 is a top plan view of a valve seat according to some embodiments.
Figure 13:
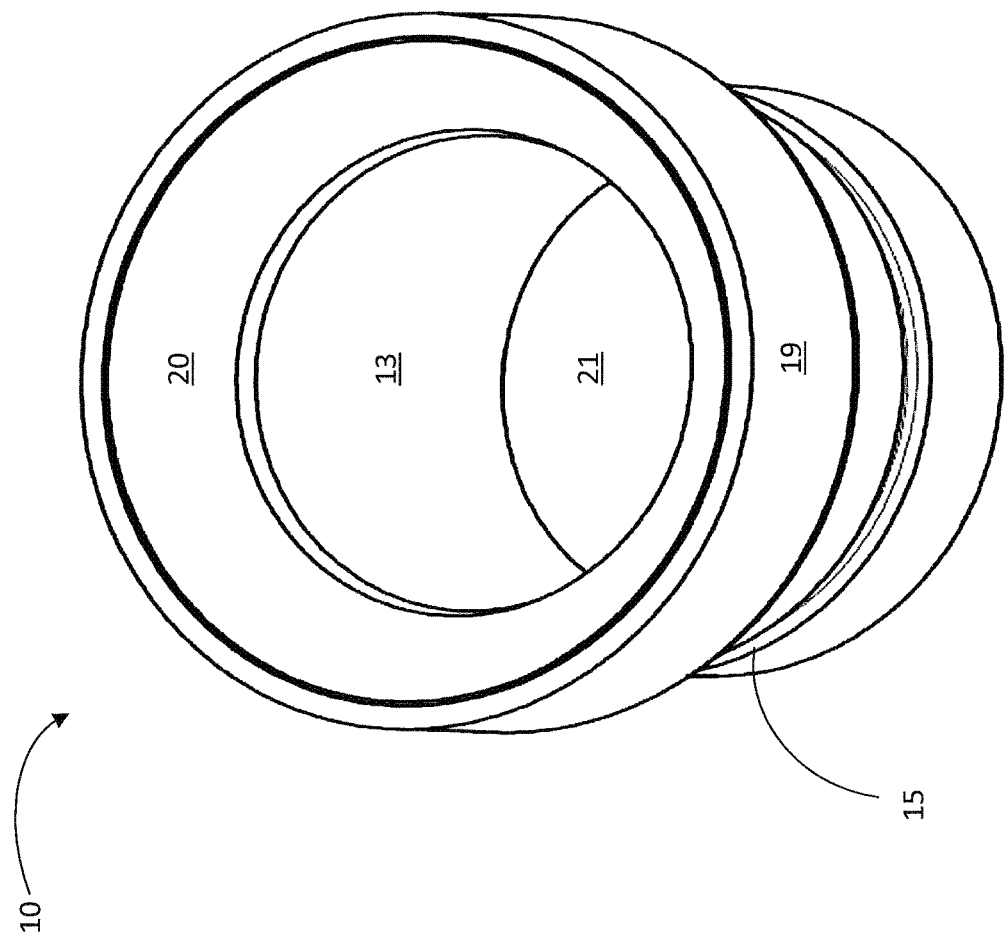
FIG. 13 is a perspective view of a valve seat according to some embodiments.
Figure 14:
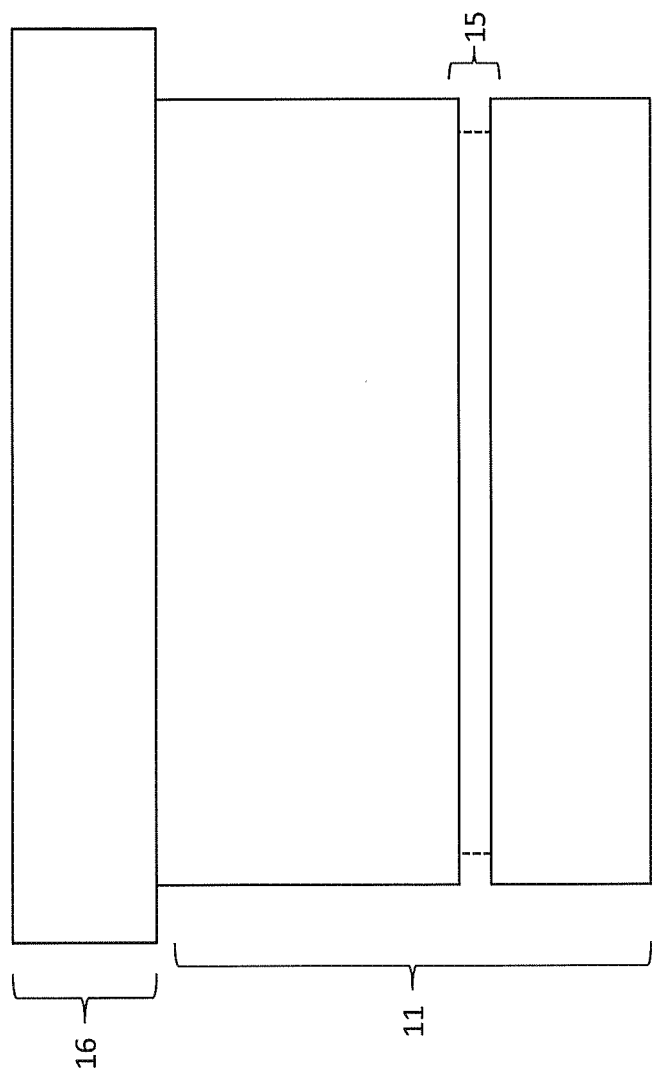
FIG. 14 is a side elevational view of a valve seat according to some embodiments.

FIG. 10 is a schematic illustrating another embodiment of a valve seat described herein. The valve seat of FIG. 10 comprises the same structural features illustrated in FIG. 9. However, the ring 19 in FIG. 10 at least partially covers the shoulder 17. The ring 19, for example, can be provided a radial flange 19a for interfacing the shoulder 17 of the second section 16. In some embodiments, the ring 19 fully covers the shoulder 17. FIG. 11 is a bottom plan view of a valve seat having the architecture of FIG. 10. As illustrated in FIG. 11, the ring 19 is coupled to the perimeter of the second section and partially covers the shoulder 17. FIG. 12 is a top plan view of a valve seat having the architecture of FIG. 10. The frusto-conical valve mating surface 20 transitions into the bore 21 of the valve seat 10. The ring 19 encases the second section 16, imparting a compressive stress condition to the second section 16. Accordingly, a compressive stress condition is imparted to the valve mating surface 20, which can assist in resisting crack formation and/or crack propagation in the mating surface 20. Moreover, FIG. 13 illustrates a perspective view of the valve seat of FIG. 10. FIG. 14 illustrates a side elevational view of a valve seat according to some embodiments, wherein a curved intersection does not exist between the first section 11 and second section 16.

As described herein, the valve seat can comprise sintered cemented carbide. In some embodiments, the first and second section of the valve seat are each formed of sintered cemented carbide. Alternatively, the first section can be formed of metal or alloy, such as steel or cobalt-based alloy, and the second section is formed of sintered cemented carbide. Forming the second section of sintered cemented carbide can impart hardness and wear resistance to the valve mating surface relative to other materials, such as steel.

In some embodiments, the second section is formed of a composite comprising sintered cemented carbide and alloy. For example, a sintered cemented carbide inlay can be coupled to a steel substrate, wherein the sintered cemented carbide inlay forms a portion or all of the valve mating surface, and the steel substrate forms the remainder of the second section. In such embodiments, the sintered carbide inlay can extend radially to contact the ring encasing the second section, thereby permitting the ring to impart a compressive stress condition to the sintered carbide inlay. In other embodiments, the steel or alloy substrate comprises a recess in which the sintered carbide inlay is positioned. In this embodiment, the outer rim of the recess is positioned between the sintered carbide inlay and ring, wherein compressive stress imparted by the ring is transmitted through the outer rim to the sintered carbide inlay.

In some embodiments, the sintered cemented carbide inlay is provided as a single, monolithic piece. The sintered cemented carbide inlay may also be provided as a plurality of radial sections. Any number of radial sections is contemplated. Providing the sintered cemented carbide inlay as a plurality of radial sections can prolong inlay life, in some embodiments, by precluding crack propagation and/or other failure modes that can induce premature failure of inlays with single piece construction. Degradation and/or failure of one radial section, for example, may not have any bearing on other radial sections of the inlay.

Sintered cemented carbide of the valve seat can comprise tungsten carbide (WC). WC can be present in the sintered carbide in an amount of at least 70 weight percent or in an amount of at least 80 weight percent. Additionally, metallic binder of cemented carbide can comprise cobalt or cobalt alloy. Cobalt, for example, can be present in the sintered cemented carbide in an amount ranging from 3 weight percent to 20 weight percent. In some embodiments, cobalt is present in sintered cemented carbide of the valve seat in an amount ranging from 5-12 weight percent or from 6-10 weight percent. Further, sintered cemented carbide valve seat may exhibit a zone of binder enrichment beginning at and extending inwardly from the surface of the substrate. Sintered cemented carbide of the valve seat can also comprise one or more additives such as, for example, one or more of the following elements and/or their compounds: titanium, niobium, vanadium, tantalum, chromium, zirconium and/or hafnium. In some embodiments, titanium, niobium, vanadium, tantalum, chromium, zirconium and/or hafnium form solid solution carbides with WC of the sintered cemented carbide. In such embodiments, the sintered carbide can comprise one or more solid solution carbides in an amount ranging from 0.1-5 weight percent.

In some embodiments, a single grade of sintered cemented carbide can be employed to form the first and second sections of the valve seat. In other embodiments, one or more compositional gradients can exist between sintered cemented carbide of the first section and second section. For example, sintered cemented carbide of the first section may have larger average grain size and/or higher metallic binder content to increase toughness. In contrast, sintered cemented carbide of the second section may have smaller average grain size and less binder for enhancing hardness and wear resistance. Additionally, a compositional gradient can exist within the first and/or second section of the valve seat. In some embodiments, sintered cemented carbide forming the valve mating surface comprises small average grain size and lower metallic binder content for enhancing hardness and wear resistance. Progressing away from the valve mating surface, the sintered cemented carbide composition of the second section can increase in grain size and/or binder content to enhance toughness and fracture resistance. In some embodiments, for example, sintered cemented carbide of high hardness and high wear resistance can extend to a depth of 50 µm-1 mm or 75-500 µm in the second section. Once the desired depth is reached, the sintered cemented carbide composition changes to a tougher, fracture resistant composition.

When the valve mating surface is formed of sintered cemented carbide, the sintered cemented carbide can have surface roughness ($R_a$) of 1-15 m, in some embodiments. Surface roughness ($R_a$) of the sintered cemented carbide can also be 5-10 µm. Surface roughness of sintered cemented carbide forming the valve mating surface may be obtained via mechanical working including, but not limited to, grinding and/or blasting techniques. Moreover, sintered cemented carbide forming the second section of the valve seat, including the valve mating surface, can exhibit a compressive stress condition of at least 500 MPa. In some embodiments, sintered cemented carbide forming the second section can have a compressive stress condition selected from Table I.

TABLE VI

| Sintered Cemented Carbide Compressive Stress (GPa) |
| --- |
| ≥1 |
| ≥1.5 |
| ≥2 |
| 0.5-3 |
| 1-2.5 |

Compressive stress condition of the sintered cemented carbide can result from compression imparted by the ring encasing the second section and/or mechanically working the sintered cemented carbide to provide a valve mating surface of desired surface roughness. Compressive stress of the sintered cemented carbide may be determined via X-ray diffraction according to the $\sin^2 \psi$ method. Sintered cemented carbide of the valve seat may also exhibit hardness of 88-94 HRA.

The ring encasing the second section can be formed of any suitable material operable to impart a compressive stress condition to the second section. In some embodiments, the ring is formed of metal or alloy, such as steel. The ring may also be formed of ceramic, cermet and/or polymeric material, such as polyurethane.

In another aspect, a valve seat comprises a first section for insertion into a fluid passageway of a fluid end and a second section extending longitudinally from the first section, the second section including a frusto-conical valve mating surface comprising sintered cemented carbide having surface roughness ($R_a$) of 1-15 µm. In some embodiments, the sintered cemented carbide of the valve mating surface is provided as an inlay ring coupled to a metal or alloy body.

In other embodiments, the second section is formed of the sintered cemented carbide. The second section can have an outer diameter greater than the outer diameter of the first section. Alternatively, the outer diameters of the first and second sections are equal or substantially equal. Moreover, the second section of the valve seat may optionally be encased by a ring as described herein.

Figure 15:
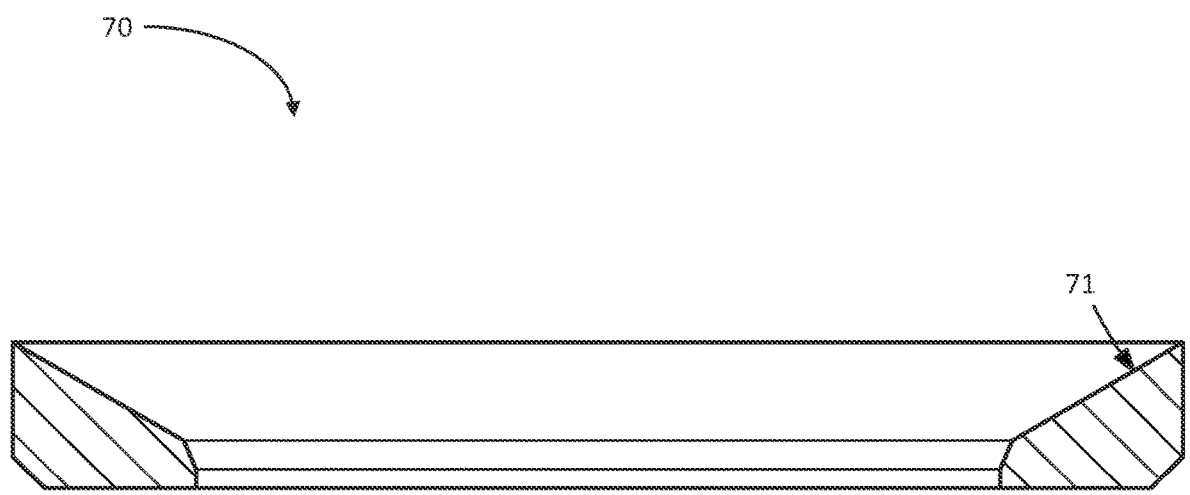
FIG. 15 is a cross-sectional view of a sintered cemented carbide inlay according to some embodiments.
Figure 16:
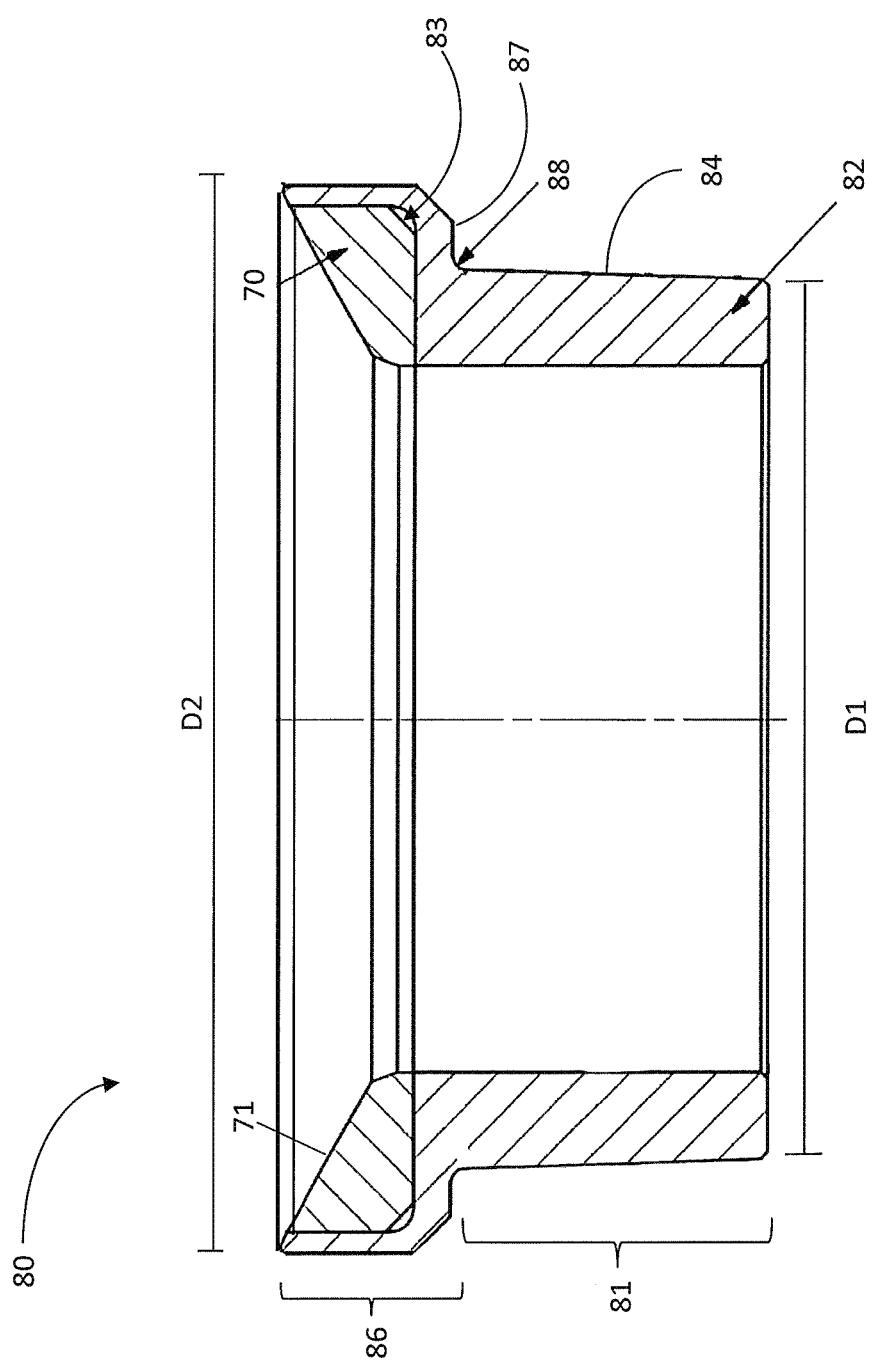
FIG. 16 is a cross-sectional view of valve seat comprising a sintered cemented carbide inlay coupled to an alloy body or casing according to some embodiments.

In another aspect, a valve seat for use in a fluid end comprises a body including a first section for insertion into a fluid passageway of the fluid end and a second section extending longitudinally from the first section. The second section comprises a recess in which a sintered cemented carbide inlay is positioned, wherein the sintered cemented carbide inlay comprises a valve mating surface and exhibits a compressive stress condition. In some embodiments, the sintered cemented carbide inlay has surface roughness ($R_a$) of 1-15 m. FIG. 15 illustrates a sintered cemented carbide inlay according to some embodiments. The sintered cemented carbide inlay 70 comprises a frusto-conical valve mating surface 71. Sintered cemented carbide forming the inlay 70 can have any composition and/or properties described above. The sintered cemented carbide inlay can be coupled to a metal or alloy body or casing. The metal or alloy body can form the first section of the valve seat and a portion of the second section. FIG. 16 is a cross-sectional view of valve seat comprising a sintered cemented carbide inlay coupled to an alloy body or casing according to some embodiments. In the embodiment of FIG. 16, the alloy body 82 forms the first section 81 of the valve seat 80 for insertion into a fluid passageway of a fluid end. The alloy body 82 also forms a portion of the second section 86 and defines a recess 83 in which the sintered cemented carbide inlay 70 is positioned. As in FIG. 15, the sintered cemented carbide inlay 70 comprises a frusto-conical valve mating surface 71 having surface roughness of ($R_a$) of 1-15 m. In some embodiments, $R_a$ of the valve mating surface 71 is 5-10 m. The sintered cemented carbide inlay 70 can be coupled to the alloy body 82 by any desired means including brazing, sintering, hot isostatic pressing and/or press fit. In some embodiments, the inner annular surface of the alloy body in the second section 86 comprises one or more protrusions for engaging a groove on the perimeter of the sintered cemented carbide inlay 70. In some embodiments, the alloy body 82 can impart a compressive stress condition to the sintered cemented carbide inlay 70. The second section 86 of the alloy body 82, for example, can impart a compressive stress condition to the sintered cemented carbide inlay 70. The sintered cemented carbide inlay 70 can exhibit compressive stress having a value selected from Table I above, in some embodiments. The alloy body 82 can be formed of any desired alloy including, but not limited to, steel and cobalt-based alloy. In the embodiment of FIG. 16, the alloy body 82 provides a portion of the second section 86 having an outer diameter D2 greater than the outer diameter D1 of the first section 81. The outer diameter D1 may vary with taper of the outer surface 84 of the first section 81, in some embodiments. A curved intersection 88 exists at the transition of the first section 81 and the second section 86. Additionally, the larger outer diameter D2 of the second section 86 creates a shoulder 87. The shoulder 87 may have a construction as described in FIGS. 9-10 herein. In other embodiments, outer diameter D1 the first section 81 and outer diameter D2 of the second section 86 are equal or substantially equal. In such embodiments where D1 equals D2, the outer surface 84 of the body 82 can be cylindrical.

Figure 17:
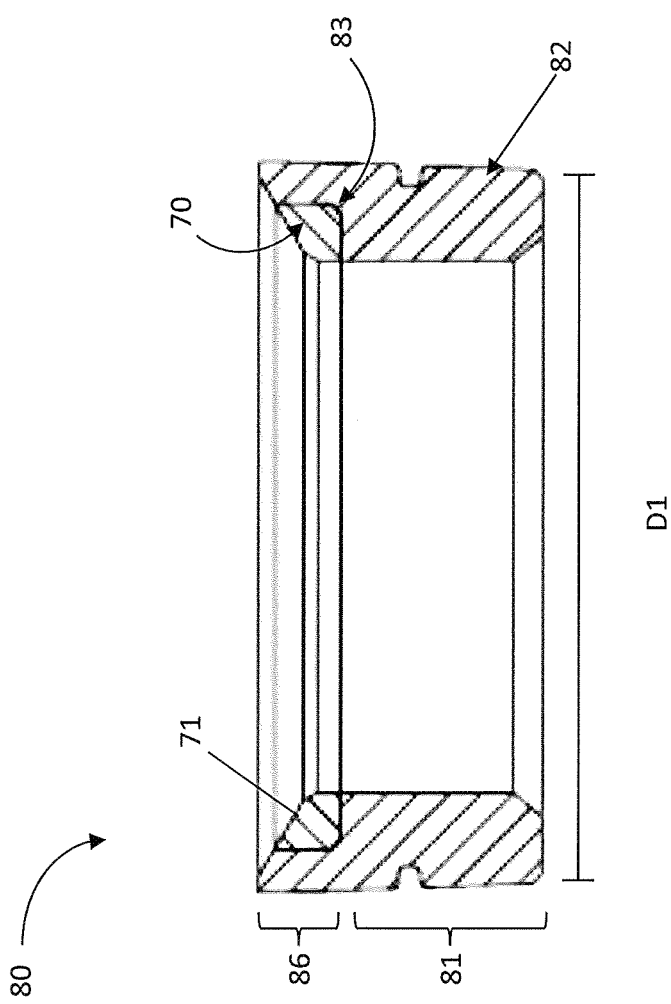
FIG. 17 is a cross-sectional view of valve seat comprising a sintered cemented carbide inlay coupled to an alloy body or casing according to some embodiments.

As described herein, the first and second sections of a valve seat can have the same outer diameter or substantially the same outer diameter. In such embodiments, the valve seat exhibits a single outer diameter in contrast to the dual outer diameters (D1, D2) of the valve seat illustrated in FIG. 16. FIG. 17 illustrates a single outer diameter valve seat comprising a sintered cemented carbide inlay according to some embodiments. The reference numerals in FIG. 17 correspond to the same components as in FIG. 16. As illustrated in FIG. 17, the valve seat 80 comprises single outer diameter, D1. In some embodiments, the valve seat 80 does not employ an inlay 70 of sintered cemented carbide or other wear resistant material. The valve mating surface, for example, can be formed of the same alloy as the remainder of the seat body. In some embodiments, a wear resistant cladding can be applied to alloy of the valve mating surface. The wear resistant cladding can comprise cobalt-based or nickel-based alloys described herein or metal matrix composite materials. In further embodiments, the outer diameter of the valve seat may taper in a direction away from the valve mating surface. The first section of the seat, for example, may have a larger outer diameter than the second section. However, a shoulder is not present between the first and second sections, and the outer diameter tapers linearly inward. Wear resistant inlays or claddings can also be used in embodiments where the outer diameter of the valve seat tapers without establishing a shoulder.

III. Fluid Flow Control

In a further aspect, methods of controlling fluid flow are also described herein. In some embodiments, a method of controlling fluid flow comprises providing a valve assembly comprising a valve seat and a valve in reciprocating contact with the valve seat. The valve comprises a head including a circumferential surface and a valve seat mating surface. Leg members extend from the head, wherein thickness of one or more of the leg members tapers in a direction away from the head. The valve is moved out of contact with the valve seat to flow fluid through the assembly, wherein the one or more tapered leg members induce laminar fluid flow around the head. The valve is subsequently mated with the valve seat to stop fluid flow through the valve. In some embodiments, a seal is coupled to the circumferential surface of the head. The seal can have a radius of curvature maintaining laminar fluid flow around the valve. The valve and valve seat of the assembly can have any architecture, composition and/or properties described in Sections I and II above. The valve and valve seat, for example, can exhibit the architecture and function as described in FIGS. 1-17 herein.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A valve comprising:
a head including a circumferential surface and a valve seat mating surface comprising sintered cemented carbide; and
leg members extending from the head, wherein thickness of one or more of the leg members tapers continuously in a direction away from the head to an end of the leg member.

2. The valve of claim 1, wherein the sintered cemented carbide is an inlay coupled to the head.

3. The valve of claim 2, wherein the inlay is a single piece of sintered cemented carbide.

4. The valve of claim 2, wherein the inlay comprises a plurality of independent radial sections.

5. The valve of claim 2, wherein the inlay is brazed to a surface of the head.

6. The valve of claim 2, wherein the inlay is mechanically coupled to the head.

7. The valve of claim 2, wherein the inlay is attached to a substrate, and the substrate is coupled to the head.

8. The valve of claim 7, wherein the substrate is coupled to the head by at least one or welding, mechanical locking and an adhesive.

9. The valve of claim 2, wherein the head comprises an annular recess in which the inlay is positioned.

10. The valve of claim 1, wherein an intermediate body member is positioned between the head and leg members.

11. The valve of claim 10, wherein a transition region between the intermediate body member and the head has a radius of curvature of 0.5 mm to 5 mm.

12. The valve of claim 1 further comprising a seal coupled to the circumferential surface of the head.

13. The valve of claim 12, wherein an exterior surface of the seal exhibits a radius of curvature.

14. The valve of claim 12, wherein the seal forms an angle with the valve seat mating surface ranging from 5 degrees to 30 degrees.

15. The valve of claim 1, wherein one or more of the leg members have a taper angle of 1-10 degrees.

16. A valve comprising:
a head including a circumferential surface and a valve seat mating surface comprising sintered cemented carbide;
a seal coupled to the circumferential surface, wherein the seal forms an angle with the valve seat mating surface to establish a primary seat contact area on the seal, the primary seat contact area proximate an outer circumferential surface of the seal; and
leg members extending from the head, wherein thickness of one or more of the leg members tapers continuously in a direction away from the head to an end of the leg member.

17. The valve of claim 16, wherein the angle ranges from 5 degrees to 30 degrees.

18. The valve of claim 16, wherein the sintered cemented carbide is an inlay coupled to the head.

19. The valve of claim 18, wherein the inlay is a single piece of sintered cemented carbide.

20. The valve of claim 18, wherein the inlay comprises a plurality of independent radial sections.

* * * * *